No. 784,713. PATENTED MAR. 14, 1905.
C. H. THORDARSON.
ELECTRIC METER RECORDING MECHANISM.
APPLICATION FILED OCT. 28, 1903.
2 SHEETS—SHEET 2.
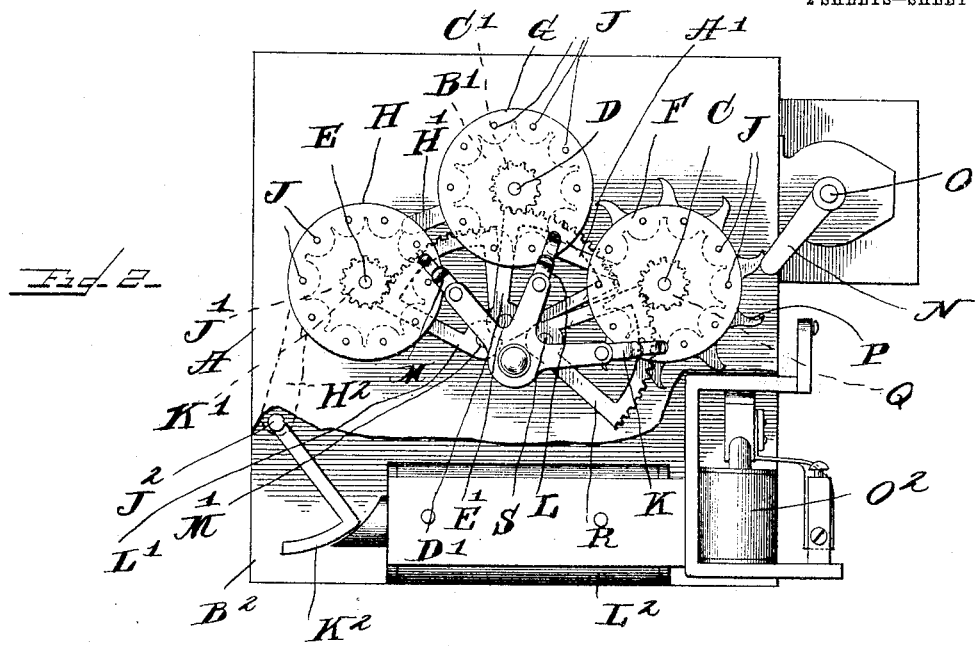
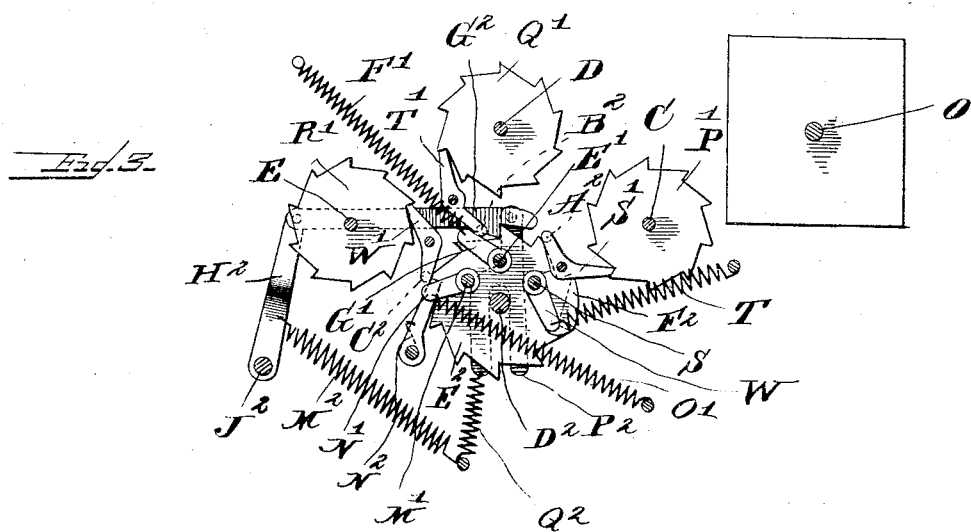
Witnesses
Inventor
Chester H. Thordarson
By Brown & Darby
Attys.

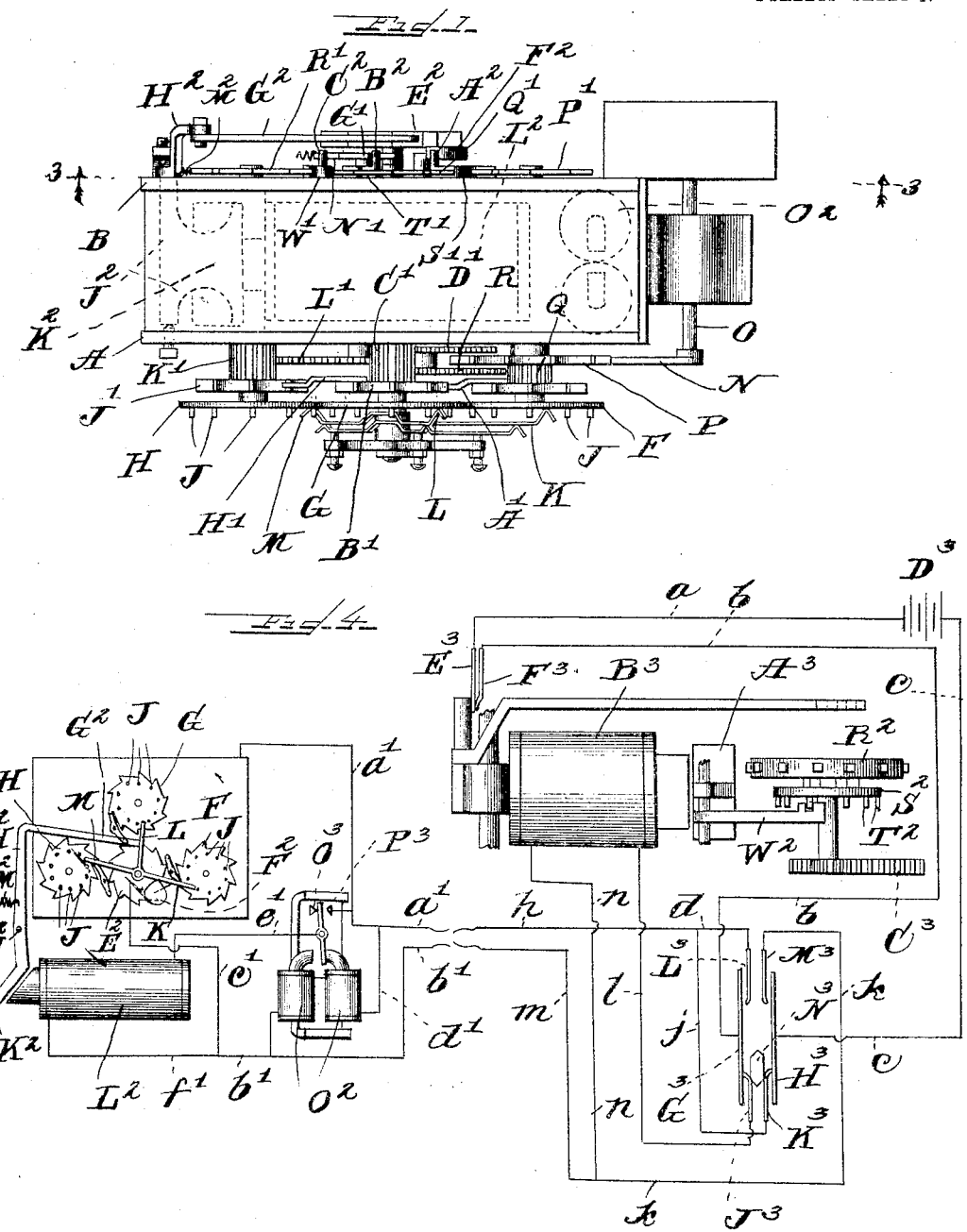

No. 784,713.	Patented March 14, 1905

UNITED STATES PATENT OFFICE.

CHESTER H. THORDARSON, OF CHICAGO, ILLINOIS.

ELECTRIC METER RECORDING MECHANISM.

SPECIFICATION forming part of Letters Patent No. 784,713, dated March 14, 1905.

Application filed October 28, 1903. Serial No. 178,840.

*To all whom it may concern:*

Be it known that I, CHESTER H. THORDARSON, a citizen of the United States, residing at Chicago, in the county of Cook and State of Illinois, have invented a new and useful Electric Meter Recording Mechanism, of which the following is a specification.

This invention relates to electric meter recording mechanism.

The object of the invention is to provide a construction of apparatus which is simple and efficient in operation whereby a meter register or indication may be recorded at a central station.

A further object of the invention is to provide a mechanism electrically operated and controllable from a central station whereby the reading of a register operated by a meter or a device of a similar nature may be recorded at the central station.

Other objects of the invention will appear more fully hereinafter.

The invention consists substantially in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a top plan view of the registering mechanism embodying in its construction the principles of my invention. Fig. 2 is a side elevation of the same. Fig. 3 is a view in vertical section on the line 3 3 of Fig. 1 looking in the direction of the arrows. Fig. 4 is a view, somewhat diagrammatic, illustrating the electrical connections and circuits of the apparatus and in association with a central-station recording mechanism.

The same part is designated by the same reference-sign wherever it occurs throughout the several views.

It has heretofore been a common practice with gas, water, electric-light, telephone, and similar companies which furnish measured service to subscribers to employ meters or registering mechanism for measuring or indicating the amount of gas, water, current, or the like supplied to a consumer, customer, or subscriber or to register the number of calls made on a telephone instrument or the like and to employ a corps of inspectors to examine the meters or registering mechanisms periodically and to take a reading of the same as a basis for bills rendered to the subscriber, consumer, or customer for the service rendered, supplied, or used. This entails a large expense upon the company in maintaining a corps of inspectors for this duty.

It is among the special purposes of my present invention to provide an apparatus arranged to be operated in any suitable or convenient manner to effect a registering of the amount of water, gas, electric current, or the like, or the number of calls made on a telephone or the like at the subscriber's residence, place of business, or station, and which apparatus is electrically operated and controlled from a central station—such, for instance, as the general or branch offices of the company—and by means of which a single operator at such central or branch station, through a suitable and coöperating recorder mechanism, may accurately read and record the readings of the register of the apparatus at the subscriber's station, residence, place of business, or the like, thus dispensing with the services or the necessity for the services of inspectors or other employees such as have heretofore been employed for visiting periodically the residences or other places of location of the meters or registering mechanisms.

In a companion application, executed of even date herewith, I have shown, described, and claimed a construction of recording mechanism at the central station employed in connection with my invention. The present application relates specially to the construction and arrangement of apparatus employed at the subscriber's station and used in conjunction with a recorder mechanism at the central station.

In the accompanying drawings I have shown a form of apparatus to be employed at each subscriber's or consumer's residence, place of business, or station and which I have found simple and efficient in carrying out the principles of my invention, but to the specific details of construction and arrangement of which, however, I do not desire to be limited or restricted, as the principles thereof may be embodied in a wide variety of specific constructions and arrangements and still fall within the spirit and scope of my invention. I have also shown, somewhat diagrammatically, the mechanism at a subscriber's station associated and in coöperative relation with a central-station recording mechanism in order that the complete operation and manner of operating the apparatus designed to be included in the present application may be fully understood.

In the drawings reference-signs A and B designate side plates suitably bolted together and constituting a framework upon which the various operating parts of the apparatus are mounted. Suitably journaled in this frame are shafts C, D, and E. Upon each of the shafts C, D, and E is mounted a disk, said disks being respectively designated F, G, and H and each carrying contact-points J. A series of contact arms or strips (designated by reference-signs K, L, and M and in electrical connection with each other) are arranged to coöperate with the contact-points J on disks F, G, and H, respectively, so as to make and break the electric circuit formed through said contacts and strips. One of the shafts C D E may be rotarily displayed from the operation of the flow of electric current, water, or gas to be measured or by the depositing of coins or tokens in a telephone system or in any other suitable or convenient manner, according to the nature of the service to be measured, and as the particular use to which my invention is to be put does not enter into or limit the scope of my invention I have merely indicated a manner of imparting a step-by-step rotary movement to shaft C of the registering mechanism and wherein an arm N is shown as mounted upon a shaft or stud O, to which shaft or stud rotary movement may be imparted in any convenient manner by the flow of water, current, or the like, as above explained, and which arm N engages at each complete revolution thereof a tooth of a wheel P on shaft C, whereby at each complete revolution of shaft O one step of rotary movement is imparted to shaft C. The rotary movement of this shaft may be opposed in any convenient manner. It is desirable, however, that such rotary movement be opposed yieldingly or by a tension which normally tends to return or restore said shaft to an initial position, while at the same time permitting said shaft to rotate indefinitely under the influence of the mechanism for imparting the step-by-step rotative movement thereto. I have shown a simple arrangement for accomplishing this purpose wherein I mount upon shaft C a pinion Q, arranged to be engaged by the teeth of a segment rack or plate R, carried upon a shaft S, suitably journaled in the framework, and the rotary movement of such shaft being yieldingly opposed in any suitable manner—as, for instance, by means of a spring T, connected to a crank-arm W, carried by said shaft. (See Figs. 2 and 3.) From this description it will be seen that the step-by-step rotative movement may be imparted to shaft C under the action of the flow of water, gas, electric current, or the like or the deposit of coins or tokens in a telephone in the usual or any ordinary manner, such rotary movements resulting in rocking the segment-rack R to the full limit thereof and against the action of spring T, and after the segment-rack has been rocked to its limit, as determined by the number of teeth carried thereby, the spring T continues to exert its tension thereon in a direction to return or restore the same to initial position, thereby returning or restoring shaft C and the contact-disk F, carried thereby, to initial position, while at the same time permitting the continued rotary movements to be imparted indefinitely to shaft C without storing up further retractive tension, the teeth of the pinion Q merely wiping by the lowermost tooth of the raised segment.

Suitably connected to revolve with shaft C is an arm A', arranged to coöperate with the teeth of a wheel B', mounted upon shaft D, whereby upon each complete rotation of shaft C one step of rotary movement is imparted to shaft D. The rotary movement of shaft D may be yieldingly opposed in any convenient manner, so as to return or restore said shaft to its initial position. This may be accomplished in any convenient manner—as, for instance, by means of a pinion C', mounted upon shaft D and arranged to be engaged by the teeth of a segment-rack D', mounted upon a shaft E', and the rotary movement of which may be opposed in any convenient manner—as, for instance, by means of a spring F' connected to a crank-arm G', carried by said shaft. (See Fig. 3.) The function and operation of spring F', shaft E', segment-rack D', and pinion C' are the same with respect to shaft D as the similar parts above described with reference to shaft C. Suitably connected to revolve with shaft D is an arm H', arranged to coöperate with the teeth of a wheel J', mounted upon shaft H, so that upon each complete rotation of shaft B one step of rotary movement is imparted to shaft H. The rotary movement of shaft H thus imparted thereto may be yieldingly opposed in any convenient manner—as, for instance, through a pinion K', segment-rack L', mounted upon a shaft M, upon which is mounted a crank-arm N', to which is connected a spring O', having the same purpose, function, and mode of operation with respect to shaft H as the similar parts above described with reference to shafts C and D.

The mechanism above described constitutes a registering mechanism in which the disk F or shaft C may constitute the units-wheel of the register, the disk G or shaft D the tens-register, and the disk H or shaft E the hundreds-register, or, if desired, these parts may respectively constitute the tens, hundreds, and thousands register or any other suitable denomination, as will be readily understood by persons skilled in the art, the essential feature being that rotary movements be imparted to shaft C and its associated disk F by the operation of the flow of water, gas, current, or the like to be measured or the successive deposit of coins or tokens in a telephone apparatus or otherwise and each complete revolution of shaft C imparting one step of rotary movement to shaft D and each complete revolution of shaft D resulting in a step of rotary movement to be imparted to shaft E. Of course it will be readily understood that this system may be extended as much as may be desired by providing additional wheels. When the several shafts C, D, and E are released after having been rotarily displaced and while returning to their initial positions, the contact-points J, carried by the disks F G H, mounted upon said shafts, respectively, wipe over the contact-arms K, L, and M, respectively, thereby making and breaking the electric circuit including said contacts and strips, and each of said disks is provided with a desirable number of contacts J. For instance, and in the form shown, each disk is provided with ten of such contacts, so that when each disk has been rotarily displaced one complete revolution and is released ten complete makes and breaks of an electric circuit will be effected during the return of such disk to initial position by reason of the contacts J wiping over their associated contact strips or arms K, L, and M. In the arrangement above described it will be observed that it is immaterial whether the shafts C, D, or E are rotarily displaced more than one complete revolution, as in any event after being displaced rotarily the return of said shafts to initial position when released will effect a number of makes and breaks of the electric circuit corresponding to the position or to the extent of rotary displacement thereof at the time of such release. It will also be seen that if said shafts are displaced more than one complete revolution the excess number of revolutions of rotary displacement thereof above one complete revolution does not effect anything further than the additional steps of rotary movement imparted thereby to the next adjacent shaft in the train and its associated contact-disk for each complete revolution of the first, and in returning to initial position if displaced to a greater extent than one complete revolution each shaft or its associated contact-disk will be returned only one complete revolution or only a portion of a revolution if said shaft is rotarily displaced for only a portion of a complete revolution.

Associated with each shaft C, D, and E and their associated contact-disks, is a releasable lock mechanism so constructed as to permit the rotary movement or displacement of said shafts and disks in one direction, but requiring a control to release the same to permit said shafts and their associated contact-disks to return to initial position. This releasable lock mechanism may be of any suitable construction and arrangement, and while, therefore, I have shown and will now describe one arrangement for accomplishing the desired object I do not desire to be limited or restricted thereto, as many changes therein and variations therefrom may readily suggest themselves to persons skilled in the art and still fall within the spirit and scope of my invention. In the particular form shown I mount a ratchet-wheel upon each of the shafts C, D, and E, said ratchet-wheels being designated, respectively, by reference-signs $P'$ $Q'$ $R'$. (See Fig. 3.) Respectively associated with ratchet-wheels $P'$ $Q'$ $R'$ are pawls $S'$ $T'$ $W'$, each pivotally mounted intermediate its ends and having one end arranged to coöperate with the teeth of their associated ratchet-wheels to permit said wheels to rotate in one direction only. These locking-pawls may be shifted or moved so as to disengage the pawl ends thereof from their associated ratchet-wheels in any suitable or convenient manner. For instance, and in the particular form shown, to which, however, my invention is not to be limited or restricted, each of said pawls is provided with a laterally-extending lug or projection $A^2$ $B^2$ $C^2$, respectively. Upon a shaft $D^2$ (see Fig. 3) is mounted a ratchet-wheel $E^2$, carrying a lug or projection $F^2$, arranged to coöperate during the rotation of said ratchet-wheel $D^2$ with the lugs or extensions $A^2$ $B^2$ $C^2$ to swing or rock said pawls out of engaging relation with respect to their associated ratchet-wheels $P'$ $Q'$ $R'$, so as to release shafts C, D, and E, respectively, to permit the same to be returned or restored to their initial positions. Rotary movement step-by-step is imparted to ratchet-wheel $E^2$, so as to bring the projection or extension $F^2$ successively into engagement with the locking-pawls $W'$, $T'$, and $S'$, respectively. This rotary movement may be imparted in any convenient manner—as, for instance, by means of a link $G^2$, carrying an engaging shoulder at its free end arranged to coöperate with the teeth of ratchet-wheel $E^2$. This link is pivotally connected at its opposite end to an arm $H^2$, carried upon a rock-shaft $J^2$. This shaft $J^2$ carries the armature $K^2$ of an electromagnet $L^2$, and the arrangement is such that when magnet $L^2$ is energized its armature $K^2$ is attracted, thereby rocking shaft $J^2$ and arm $H^2$ against the action of a spring $M^2$ in a direction to withdraw the shoulder on the free end thereof, which engages or coöperates with the teeth of ratchet-wheel $E^2$, and when the circuit of magnet $L^2$ is broken or said magnet deënergized the arm $H^2$ is rocked or swung under the influence of spring M² in a direction to project link G² to engage a tooth of ratchet-wheel E² and impart thereto one step of rotary movement, and hence by successively energizing the electromagnet L²—as, for instance, by successively making and breaking the circuit thereof—the ratchet-wheel E² is rotatively displaced successively, so as to eventually carry the cam projection F² thereon into position to successively disengage the locking-pawls W' T' S', as above described. If desired, reverse rotation of ratchet-wheel E² may be prevented in any convenient manner—as, for instance, by means of a spring-pressed pawl N².

The free end of link G² may be held yieldingly in engaging relation with respect to the teeth of ratchet-wheel E² in any suitable or convenient manner permitting the engaging end of said link to ride over the teeth when said link is shifted endwise in one direction, but causing the same to drop down behind and in engaging relation with respect to said teeth when said link is moved or projected endwise in the opposite direction. A means which I have found suitable for this purpose is shown, comprising a yoke P², straddled upon shaft D² and to which the free end of link G² is pivotally connected, said yoke being yieldingly drawn in one direction in any convenient manner—as, for instance, by means of the spring Q².

Reference-sign O² designates a polarized magnet arranged, as will be more fully hereinafter described, to control the circuits of electromagnet L².

The register or meter mechanism above described may be employed in connection with any suitable or convenient recording mechanism at the central station adapted to effect a record of the readings of the meter or registering mechanism so long as such recorder mechanism and its associated parts are so arranged as to enable the central-station operator to control the circuits of magnet L² or of the polarized magnet O², so as to effect the proper release of the meter or register mechanisms. In Fig. 4 I have shown, somewhat diagrammatically, the register or meter mechanism above described in association with a form of recorder mechanism and control devices at a central or other station whereby the readings of the register or meter mechanism may be recorded at such central or other station; but I do not desire to be limited or restricted in respect to the specific construction and arrangement of the recorder mechanism employed. In the form shown a type-wheel R² is employed for recording the meter-readings. This type-wheel is adapted to be released from a tension tending to impart rotary movement thereto by means of a disk S², having stop-pins T², with which coöperates a pawl-arm W², said arm being actuated by the armature A³ of an electromagnet B³. The type-wheel R² after being released to the desired extent, as will appear more clearly hereinafter, in order to bring a particular type of the type-wheel into recording position is returned to its initial position to restore the tension thereon in any convenient manner—as, for instance, by means of a rack (indicated at C³) suitably actuated—as more fully explained in the companion application above referred to.

D³ designates a source of current, which may be a battery or any other suitable or convenient type of generator. One side of the source of current D³ is connected, through a wire a, to a contact-strip E³, arranged to be normally closed against a contact-strip F³, when the recorder mechanism is in condition to receive impulses of current through the line-circuit controlled by the make-and-break contact points and arms of the meter or registering mechanism. The contact-strip F³ is connected by wire b to a switch device, which I will call a "pole-changing switch," comprising side plates G³ H³, the wire b connecting to contact-strip G³. The other side of the source of current D³ is connected, through wire c, to contact-strip H³. Two pairs of coöperating contact-strips (designated, respectively, J³ K³ and L³ M³) are arranged in coöperative relation with respect to the contact-strips G³ H³, so that the members of such pairs of contact-strips may be brought into electrical connection, respectively, with said contact-strips G³ H³. Any suitable means may be provided for effecting this electrical contact—such, for instance, as an insulating arm or part N³. When this part is moved to one limit of its movement, it operates to cause contact-strips J³ K³ to be, respectively, brought into contact with strips G³ H³, and this is the position of the parts shown in Fig. 4. When said part N³ is moved to the opposite limit of its movement, it operates to cause a breaking of contact between strips J³ K³ and G³ H³, respectively, and to make contact, respectively, between strips L³ M³ and strips or plates G³ H³. The strip L³ is connected, through wire d, with a line-wire h. The strip K³ is connected, through wire j, with line-wire h. The strip M³ is connected, through wire k, to line-wire m. The strip J³ is connected, through wire l, to the coils of magnet B³, the other terminal of said coils being connected, through wire n, to wire k and line-wire m. Line-wires h m are adapted to be brought into electrical connection in any convenient manner with the line-wires a' b', leading to the meter or register mechanism. Any suitable line-wires may be employed for connecting up the apparatus at the subscriber's residence, place of business, or station with the recorder mechanism at the central station—such, for instance, as the ordinary telephone or electric-light circuits when such circuits are not otherwise employed. The line-wire a' at the subscriber's station or at the meter or register mechanism is connected to the mass or base of the framework containing the meter or register mechanism and with which the contacts J of the contact disks or wheels F, G, and H are in electrical connection. The line-wire $b'$ is in electrical connection through wire $c'$ with the contact arms or strips K, L, and M, with which said contacts J coöperate, said contact strips or arms K L M being otherwise insulated from the mass or mechanism. The coils of polarized magnet $O^2$ are included in a circuit $d'$, arranged to bridge across the line-wires $a' b'$, and said polarized magnet controls a switch-arm $O^3$, arranged when in one position to make contact with a contact-point $P^3$ in suitable electrical connection with line-wire $a'$, and when said switch-arm $O^3$ is in its other position circuit connection between said switch-arm $O^3$ and contact $P^3$ is broken. Switch-arm $O^3$ is in electrical connection through wire $e'$ with one terminal of the coil of magnet $L^3$, the other terminal of said magnet-coil being connected, through wire $f'$, with line-wire $b'$. With this explanation of the wiring and electrical connections of the apparatus I will now describe the operation of the device:

Suppose the meter or register mechanism has been actuated by the flow of water, gas, electric current, or the like or by the deposit of coins, tokens, or the like in the case of the use of the apparatus in connection with a telephone, so that register or meter wheels F, G, and H have been rotarily displaced or actuated a sufficient number of times for said wheels to register or indicate "573"—that is, wheel H has been rotarily displaced five steps of its rotary movement, wheel G has been rotarily displaced a sufficient number of complete revolutions to effect the five steps of rotary movement of wheel H and seven additional steps, while wheel F has been rotarily displaced a sufficient number of complete revolutions to effect the extent of rotary movement of wheels G and H as above indicated and has been rotarily displaced three additional steps. It will be remembered that the rotary movements thus imparted to the wheels F, G, and H have been against the action of a tension device applied thereto tending to return or restore said wheels or disks to their initial positions, the segment-racks R, D', and L' permitting the continued rotary movement of said wheels beyond one complete revolution, but always returning or restoring said wheels only a sufficient degree to bring them to initial or zero position. It will also be remembered that in the return movement of each of said wheels F, G, and H a make and break of circuit between contacts J and arms K, L, and M will be effected according in number to the extent of rotary displacement of said wheels, thereby intermittently making and breaking the following circuit: from one side of the source of current at $D^3$, through wire $a$, strip $E^3$, strip $F^3$, $b$, $G^3$, $J^3$, $l$, $B^3$, $n$, $m$, $b'$, $c'$, the particular contact-arm K, L, or M which coöperates with the contact-arms of the particular wheel F G H that is returned to its initial position, contacts J of the wheel thus returned, the mass or framework of the mechanism $a'$, $h$, $j$, $K^3$, $H^3$, $c$, to the opposite side of the source of current, thus successively making and breaking the circuit of magnet $B^3$, thereby successively actuating the armature $A^3$ thereof and releasing step by step the type-wheel $R^2$ to permit the same to be brought into recording position corresponding to the number of makes and breaks of the circuit effected between contacts J and their coöperating contact-arms K, L, and M. After one of the contact wheels or disks F G H is thus returned to initial position, as above described, the type-wheel $R^2$ is brought into recording position to record the number of steps of rotary displacement to which said contact-wheel has been rotarily displaced. Therefore the number of contacts J on each of the wheels F G H should correspond to the number of type carried upon the periphery of the type-wheel. Thus, as shown and in practice, ten figures are carried on the periphery of the type-wheel, running consecutively from "1" to "9" and then to "0," and consequently each of the contact-wheels F G H should carry ten contact-points J. Thus a definite relation is established between the number of times the circuit is made and broken by the return of the contact-wheels F G H to initial position, and the particular type carried by the type-wheel. Consequently upon the return of each of the wheels F G H the tpye-wheel is brought into recording position to record the reading or register of said wheels, such record being made or effected after the return of each of said wheels F G H. In order to release said wheels F G H to permit them to return to initial position after being rotarily displaced, it is necessary for magnet $L^2$ to be energized and deënergized in order to actuate the release mechanism. The circuit of magnet $L^2$ is controlled by the polarized magnet $O^2$ and the pole-changing switch. In the circuit above traced it will be observed that sufficient current will flow through the bridging-circuit $d'$ of the polarized magnet to energize the coils thereof sufficiently to hold switch-arm $O^3$ in the position indicated in Fig. 4, and hence out of contact with contact-point $P^3$. Consequently the circuit of magnet $L^2$ will be broken. Now by shifting the part $N^3$ of the pole-changing switch to the opposite limit of its movement contact between strips $J^3$ $K^3$ and $G^3$ $H^3$, respectively, will be broken, and contact will be established between strips $L^3$ $M^3$ and plates $G^3$ $H^3$, respectively. Thereupon the following circuit will be completed: from one side of the source of current at $D^3$, through conductor $a$, $E^3$, $F^3$, $b$, $G^3$, $L^3$, $d$, $h$, $a'$, where the current will divide, part flowing through bridging-circuit $d'$, polarized magnet $O^2$, wire $b'$, and return through $m$, $k$, $M^3$, $H^3$, $c$, to the opposite side of the source of current. It will be observed that this path is in the opposite direction from that first above described through polarized magnet $O^2$. Consequently switch-arm $O^3$ will be actuated so as to make contact with contact $P^3$. Thereupon circuit will be completed from line-wire $a'$, $P^3$, $O^3$, $e'$, $L^2$, $f'$, $b'$, and on back to the other side of the battery as above traced. This will result in an energization of magnet $L^2$ and the consequent attraction of its armature $K^2$ against the action of spring $M^2$, hence rocking shaft $J^2$ and arm $H^2$, carried thereby, and projecting link $G^2$ in a direction to withdraw the shoulder upon the free end of said link, so as to engage behind the next tooth of ratchet-wheel $E^2$. Upon the breaking of circuit between strips $L^3$ $M^3$ and $G^3$ $H^3$, respectively, of the pole-changing switch the circuit of magnet $L^2$ is broken, and the spring $M^2$ acting upon arm $H^2$ will result in projecting link $G^2$ in a direction to rotarily actuate ratchet-wheel $E^2$ through one step of its rotary movement. By repeatedly making and breaking circuit between strips $L^3$ $M^3$ and plates $G^3$ $H^3$, respectively, the circuit of magnet $L^2$ is repeatedly made and broken, thereby repeatedly imparting steps of rotary movement to ratchet-wheel $E^2$ until finally the cam projection $F^2$ thereon is brought into engaging relation with respect to the pin $C^2$ of locking-pawl $W'$, thereby rocking said locking-pawl out of engaging relation with respect to the locking ratchet-wheel $R'$, and hence permitting the rotary tension under which shaft E is held in rotative displacement to return or restore said shaft to its initial position through the actuation of segment-rack $L'$ and the engagement of the teeth thereof with the teeth of pinion $K'$ upon said shaft E, this return of shaft E causing the contacts J of contact disk or wheel H to wipe over its coöperating contact-arm M and to make and break circuit therebetween a number of times corresponding to the extent or degree to which said contact wheel or shaft E has been rotarily displaced during the operation of the meter or register mechanism, such return (in the particular instance selected for illustrative purposes) resulting in making and breaking circuit between contacts J and contact-arm M five times. The making and breaking of the circuit between contacts J and contact-arm M makes and breaks the circuit of magnet $B^3$ of the recorder mechanism five times, thereby actuating the type-wheel through five steps of its rotary movement and bringing said type-wheel into position for No. 5 type thereon to effect a record. The record is then made by the operator at the central station, such operation resulting in restoring or returning the type-wheel to its initial position. The operator then again manipulates the pole-changing switch to close circuit between contact-strips $L^3$ $M^3$ and plates $G^3$ $H^3$, respectively, thereby again completing the circuit of magnet $L^2$, resulting in positioning the pawl-link $G^2$ to effect another step of rotary movement of ratchet-wheel $E^2$ when the circuit of magnet $L^2$ is broken. This circuit is broken by the operator moving the part $N^3$ of the pole-changing switch so as to break circuit between strips $L^3$ $M^3$ and plates $G^3$ $H^3$, respectively. The breaking of this circuit results in the advancement of ratchet-wheel $E^2$ through another step of its rotary movement, thereby bringing cam projection $F^2$ thereon into position to engage pin $B^2$ of locking-pawl $T'$ and releasing said locking-pawl from engaging relation with respect to ratchet-wheel $Q'$, and hence permitting shaft D and the contact wheel or disk G, carried thereby, to be returned to their initial or zero position, such return of contact-wheel G resulting in the instance above given in effecting seven makes and breaks of circuit between contacts J and their coöperating contact-arm L, thereby in the same manner as above explained resulting in positioning type-wheel $R^2$ to record No. 7 type thereon. This record is now made, and then the operator again manipulates the pole-changing switch to again make and break circuit between contacts $L^3$ $M^3$ and strips or plates $G^3$ $H^3$, respectively, thereby resulting in another step of rotary movement of ratchet disk or wheel $E^2$, so as to bring the cam projection $F^2$ thereon into position to effect a release of locking-pawl $S'$ with respect to its associated ratchet-wheel $P'$, thereby releasing shaft C and the contact disk or wheel F, carried thereby, the return movement of said contact-wheel resulting, in the particular illustration above given, in causing three of the contacts J thereon to wipe over their associated contact-arm K, thereby making and breaking circuit of magnet $B^3$ three times and bringing type-wheel $R^2$ into position for the No. 3 type thereon to be recorded, thus completing the record "573."

It is obvious that the pole-changing switch may be manipulated in any suitable manner. However, a definite relation should be borne between the number of times said switch is manipulated initially, so as to release the first contact-wheel of the meter or register mechanism and the number of teeth upon release ratchet-wheel $E^2$. It will also be observed that when the circuit of magnet $L^2$ is completed nothing takes place due to the completion of such circuit except to position the pawl-link $G^2$, and said pawl-link is actuated to perform its work of rotarily displacing disk $E^2$ upon the breaking of the circuit of magnet $L^2$, such work being accomplished by the action of the spring $M^2$. It will also be seen that during the time the circuit of magnet $L^2$ is completed the magnet B³ of the recorder mechanism is cut out of circuit; but by reason of the above peculiar arrangement sufficient time is permitted to elapse after the circuit of magnet L² is broken, and during the operation of arm H², link G², and ratchet-wheel E² under the influence of spring M², and during the time required for cam projection F² to disengage a locking-pawl W' T' S' to permit the operator at the central station to reëstablish the circuit of magnet B³ by shifting or moving the part N³ of the pole-changing switch to the opposite limit of its movement, so that by the time the contact-wheels F G' H begin their rotative movement to initial position so as to make and break circuit between the contacts J thereof and their associated contact-arms K L M the circuit of magnet B³ is again completed. By this arrangement I am also enabled to secure a more smooth and certain operation of the apparatus.

I do not claim herein as of my invention the combination, in an electrical recorder, of a register, means for registering thereon by unit-tallies, associated means for registering definite groups of unit-tallies in units of higher denominations, means for taking a reading of the accumulated tallies in groups of units, one group for each denomination, an associated transmitting mechanism, and an electric circuit over which said reading is sent by the transmitting mechanism, inasmuch as the readings of the accumulated tallies and registering mechanism, in accordance with my invention, are not taken in groups of units with one group for each denomination. On the contrary, the readings of the accumulated tallies, in accordance with my invention, are taken by the successive actuation of a single printing-wheel and which does not print in groups of units, each denomination of the reading being of a single integer and not a group.

It is obvious that many variations and changes in the details of construction and arrangement would readily occur to persons skilled in the art and still fall within the spirit and scope of my invention. I do not desire, therefore, to be limited or restricted to the exact details shown and described; but, Having now set forth the object and nature of my invention and a construction and arrangement embodying the principles thereof and having described such construction, its purpose, function, and mode of operation, what I claim as new and useful and of my own invention, and desire to secure by Letters Patent, is—

1. In an electric meter recording mechanism, the combination with circuit make and break devices for the unit of each denomination to be recorded, register or meter mechanism for actuating the same, and circuits controlled by said make and break devices, and a recorder mechanism for such register, and electrical devices arranged in said circuits for controlling said recorder mechanism, as and for the purpose set forth.

2. The combination with a meter or register mechanism including circuit make and break devices for the unit of each denomination to be recorded, and means for actuating the same, of recorder mechanism, and electrical devices arranged in the circuits to be made and broken for controlling the recorder mechanism, as and for the purpose set forth.

3. The combination with a meter or register mechanism including means for actuating the same, of stop devices for locking said mechanism, means for releasing said stop mechanism, means beyond the control of the subscriber for controlling said releasing means, and means actuated by the return of such mechanism to initial position for making and breaking electric circuits, a printing-wheel, and electrical devices arranged in the circuits to be made and broken for controlling said printing-wheel, as and for the purpose set forth.

4. The combination with a meter or register mechanism including circuit make and break devices for the unit of each denomination to be recorded, means for actuating said make and break devices for displacing the same according to the meter action, locking mechanism for maintaining said make and break devices in displaced position, means tending to return said make and break devices to initial position, circuits made and broken by the return of said devices, a recorder mechanism, and electrical devices arranged in said circuits for controlling said recorder mechanism, as and for the purpose set forth.

5. The combination with a meter or register mechanism including wheels or disks one for each denomination to be recorded, said wheels or disks carrying contact-points, and means for rotarily displacing said wheels or disks, of coöperating contacts, a circuit including said contact-points and contacts whereby during the return of said wheels or disks said circuit is made and broken, a recorder mechanism, and electrical devices arranged in said circuit for controlling said recorder mechanism, as and for the purpose set forth.

6. The combination with a meter or register mechanism including contact wheels or disks one for each denomination to be recorded, said wheels or disks mounted for rotary movement and carrying contacts, means for actuating said wheels or disks to displaced position, contact-arms with which said contacts coöperate when said wheels or disks are returned to initial position to make and break an electric circuit, and locking mechanism for maintaining said wheels or disks in rotarily-displaced position, of means for releasing said locking mechanism, and a recorder mechanism, and electrical devices arranged in the circuit to be made or broken for controlling said recorder mechanism, as and for the purpose set forth.

7. In an apparatus of the class described, a meter or register mechanism including rotarily-mounted register wheels or disks, means for rotarily displacing said wheels or disks, means for yieldingly opposing the rotary displacement of said disks, a locking mechanism for retaining said wheels or disks in displaced position, circuit make and break devices actuated by the return of said wheels or disks to initial position, and means arranged at the central station for controlling the release of said locking mechanism, in combination with a printing-wheel, and electrical devices arranged in the circuit made and broken for controlling said printing-wheel, as and for the purpose set forth.

8. In an apparatus of the class described, a meter or register mechanism including register-wheels mounted for rotary displacement, one for each denomination to be recorded, each succeeding wheel being actuated by the preceding wheel in the train, means for rotarily displacing the initial wheel, means for yieldingly opposing the rotative displacement of said wheels, lock mechanism for maintaining said wheels in rotarily-displaced position, means for automatically releasing said locking mechanism, a recorder mechanism, and means actuated by the return of said register-wheels to initial position for controlling said recorder mechanism, as and for the purpose set forth.

9. In an apparatus of the class described, meter or register mechanism including rotarily-mounted register-wheels arranged in train, means for rotatively actuating one of said wheels, a locking mechanism for maintaining said wheels in rotatively-displaced position, electrical devices for automatically releasing said locking mechanism, and means for controlling said electrical devices, an electric circuit arranged to be made and broken by the return of each of said wheels to initial position, a recorder mechanism, and electrical devices arranged in said circuit for controlling said recorder mechanism, as and for the purpose set forth.

10. In an apparatus of the class described, a meter or register-wheel, contact-points carried thereby, a contact-arm coöperating with said points, means for rotatively displacing said wheel, a tension arranged to oppose the rotative displacement of said wheel and operating to normally return or restore said wheel to initial position, a locking mechanism for maintaining said wheel in rotatively-displaced position, electrical devices for releasing said lock, means for controlling said electrical devices solely from the central station, a circuit for said contact-arm and points whereby during the return of said wheel to initial position said circuit is made and broken, a recorder mechanism, and electrical devices arranged in said circuit for controlling said recorder mechanism, as and for the purpose set forth.

11. In an apparatus of the class described, a meter or register-wheel mounted for rotary movement, a pinion mounted to rotate with said wheel, a segment-rack engaging the said pinion, means for yieldingly opposing the movement of said rack, a locking device for maintaining said wheel in rotatively-displaced position, means for releasing said lock, a circuit, means operated by the return of said wheel to initial position for successively making and breaking said circuit, a recorder mechanism, and electrical devices arranged in said circuit for controlling said recorder mechanism, as and for the purpose set forth.

12. In an apparatus of the class described, a shaft, a meter or register-wheel, and a ratchet-wheel mounted on said shaft, means for rotatively displacing said shaft, means for yieldingly opposing the rotative movement of said shaft and operating to return or restore the same to initial position, a pawl engaging said ratchet-wheel to maintain said shaft in rotatively-displaced position, a circuit, means operated by the return of said wheel to initial position after rotary displacement for making and breaking said circuit, means controlled solely from the central station for disengaging said locking-pawl, a recorder mechanism, and means arranged in said circuit for controlling said recorder mechanism, as and for the purpose set forth.

13. In an apparatus of the class described, a shaft, means for rotatively displacing said shaft, a ratchet-wheel mounted on said shaft, a pawl coöperating therewith to lock said shaft in rotarily-displaced position, means normally tending to return or restore said shaft to initial position, a circuit, means actuated by the return of said shaft to initial position for making and breaking said circuit, means beyond the control of the subscriber for releasing said pawl, a recorder mechanism, and electrical devices arranged in said circuit for controlling said recorder mechanism, as and for the purpose set forth.

14. In an apparatus of the class described, a shaft, means for rotatively displacing the same, means for opposing the rotative displacement of said shaft including a segment-rack and a pinion arranged to intermesh with each other, a ratchet-disk mounted on said shaft, a locking-pawl therefor, means for releasing said locking-pawl, a circuit, means actuated by the return of said shaft to initial position for making and breaking said circuit, a printing-wheel, and electrical devices arranged in said circuit for successively positioning said printing-wheel, as and for the purpose set forth.

15. In an apparatus of the class described, a wheel or disk, means for rotatively displacing said wheel or disk, means for yieldingly opposing the rotative displacement of said disk, a lock for locking said disk in rotatively-displaced position, a ratchet mechanism for releasing said lock, means beyond the control of the subscriber for controlling said ratchet mechanism, a circuit, means actuated by the return of said wheel or disk to initial position for making and breaking said circuit, a printing-wheel, and electrical devices arranged in said circuit for controlling said printing-wheel, as and for the purpose set forth.

16. In an apparatus of the class described, a wheel or disk mounted for rotary movement, means for rotatively displacing said wheel or disk, means for opposing the rotative displacement of said wheel or disk, a lock for locking said wheel or disk in rotatively-displaced position, and including a pawl, a ratchet-wheel, means for actuating the same, said ratchet-wheel operating to release said pawl, a circuit, means actuated by the return of said wheel or disk to initial position for making and breaking said circuit, a recorder mechanism, and electrical devices arranged in said circuit for controlling said recorder mechanism, as and for the purpose set forth.

17. In an apparatus of the class described, a wheel or disk, means for rotatively displacing the same, means for yieldingly opposing the rotative displacement thereof, a locking-pawl for locking said wheel or disk in rotatively-displaced position, a ratchet-wheel carrying a cam projection arranged to engage said locking-pawl to disengage the same, means for actuating said ratchet-wheel, a circuit, means actuated by the return of said wheel to initial position for successively making and breaking said circuit according to the extent of rotary displacement of said wheel, a recorder mechanism, and electrical devices arranged in said circuit for controlling said recorder mechanism, as and for the purpose set forth.

18. In an apparatus of the class described, a rotatable disk or wheel, means for rotatively displacing the same, tension devices for yieldingly opposing the rotative displacement of said wheel or disk, locking mechanism for locking said wheel or disk in displaced position, and including a locking-pawl, a cam-wheel for disengaging said locking-pawl, electrical devices for actuating said cam-wheel, an electric circuit, means actuated by the return of said wheel or disk to initial position for successively making and breaking said circuit according to the extent of rotary displacement of said wheel, a recorder mechanism, and electrical devices arranged in said circuit for controlling said recorder mechanism, as and for the purpose set forth.

19. In an apparatus of the class described, a shaft, a disk or wheel mounted thereon, a pinion also mounted on said shaft, means for rotatively displacing said shaft, a pivotally-mounted segment-rack arranged to mesh with said pinion, a spring arranged to oppose the swinging movement of said rack, whereby when said shaft and disk or wheel are rotatively displaced said rack under the influence of said spring normally tends to return or restore said shaft and disk or wheel to initial position, a ratchet-wheel also mounted upon said shaft, a locking-pawl therefor, a cam-wheel for disengaging said locking-pawl, means for operating said cam-wheel, an electric circuit, means operated by the return of said wheel or disk to initial position for successively making and breaking said circuit according to the extent of rotary displacement thereof, a recorder mechanism, and electrical devices arranged in said circuit and operated by the makes and breaks of such circuit for controlling said recorder mechanism, as and for the purpose set forth.

20. In an apparatus of the class described, a wheel or disk carrying contact-points, means for imparting a step-by-step rotary movement to said wheel or disk, means for yieldingly opposing the rotative movement of said wheel or disk, a fixed contact-arm with which said contact-points coöperate to make and break an electric circuit including said points and arm, a stop device for locking said wheel or disk in displaced position, means beyond the control of the subscriber for releasing said stop device to permit said wheel or disk to return to initial position, a recorder mechanism, and electrical devices arranged in the circuit made and broken by said points and contact-arm and operated by the makes and breaks of said circuit for controlling said recorder mechanism, as and for the purpose set forth.

21. In an apparatus of the class described, a train of wheels or disks, gearing whereby one complete rotation of each wheel imparts a step of rotary movement to the wheel or disk next adjacent thereto in said train, means for rotatively actuating one of said wheels, means for yieldingly opposing the rotary displacements of said wheels, a lock mechanism for holding each of said wheels or disks in rotative displacement, means for successively releasing said lock mechanisms, an electric circuit, means actuated by the return of each of said wheels or disks to initial position for successively making and breaking said circuit according to the extent of rotary displacement of said wheels or disks, a recorder mechanism, and electrical devices arranged in the circuit made and broken by said make and break devices, and operated by the make and break in said circuit, for controlling said recorder mechanism, as and for the purpose set forth.

22. In an apparatus of the class described, a series of register-wheels, gearing intermediate said wheels whereby the complete rotation of each wheel imparts one step of rotary movement to the next succeeding wheel in the train, means for rotatively displacing the first wheel of the train, means for yieldingly opposing the rotative displacement of each of said wheels, a locking device for each of said wheels operating to lock said wheels in rotatively-displaced position, automatic devices for successively releasing said locks, an electric circuit, means actuated by the return of each of said wheels to initial position for successively making and breaking said circuit a number of times corresponding to the extent of rotary displacement of said wheels, a recorder mechanism, and electrical devices arranged in said circuit, and operated by the makes and breaks thereof, for controlling said recorder mechanism, as and for the purpose set forth.

23. In an apparatus of the class described, a series of register-wheels arranged in a train, gearing intermediate said wheels whereby the complete rotation of one of said wheels imparts one step of rotary movement to the next wheel of the train, a pinion connected to rotate with each wheel, a swinging rack for each of said pinions, means for yieldingly opposing the swinging movement of said racks, a locking mechanism for locking each of said wheels in rotarily-displaced position, means for successively releasing said locking mechanism to permit said wheels to return successively to initial position, a circuit, means actuated by the return of each of said wheels to initial position for successively making and breaking said circuit a number of times dependent upon the degree or extent of rotary displacement of said wheels, a recorder mechanism, and electrical devices arranged in the circuit, and operated by the make and break of said circuit, for controlling said recorder mechanism, as and for the purpose set forth.

24. In an apparatus of the class described, a series of disks or wheels arranged in train, gearing intermediate said wheels whereby each complete rotation of a wheel imparts one step of rotary movement to the next adjacent wheel, means for rotatively displacing, step by step, one of said wheels, means for yieldingly opposing the rotative displacement of said wheels, a locking-pawl for locking each of said wheels in rotatively-displaced position, a cam-wheel, means for rotating said cam-wheel whereby said locking-pawls are successively disengaged to permit said wheels or disks to return to initial position, an electric circuit, means actuated by the return of each of said disks or wheels for successively making and breaking said circuit a number of times dependent upon the extent of rotary displacement of said wheels, a recorder mechanism, and electrical devices arranged in said circuit, and operated by the makes and breaks thereof, for controlling said recorder mechanism, as and for the purpose set forth.

25. In an apparatus of the class described, a series of disks or wheels arranged in train, gearing intermediate said wheels whereby one step of rotary movement is imparted to each wheel upon the complete rotation of the preceding wheel of the train, means for imparting a step-by-step rotary movement to one of said wheels, means for yieldingly opposing the rotative movement of each of said wheels, a locking-pawl for locking each of said wheels in rotative displacement, release mechanism for said locking-pawls, electrical devices for controlling the action of said release mechanism, means for controlling the circuit of said electrical devices, an electric circuit, means actuated by the return of each of said wheels or disks to initial position for successively making and breaking said circuit a number of times corresponding to the extent of rotary displacement of said disks or wheels, a recorder mechanism, and electrical devices arranged in said circuit for controlling said recorder mechanism, as and for the purpose set forth.

26. In an apparatus of the class described, circuit make and break devices, means for actuating the same, means normally tending to return or restore said devices to initial position, locking mechanism for locking said devices in displaced position, a release mechanism for said locking devices including a magnet, means arranged at the central station for controlling the circuit of said magnet, means for yieldingly opposing the action of said magnet, a printing-wheel, and electrical devices arranged in the circuit of said make and break devices for controlling said printing-wheel, as and for the purpose set forth.

27. In an apparatus of the class described, circuit make and break devices, and means for displacing the same from initial position, locking mechanism for maintaining said devices in displaced position, a magnet for releasing said locking mechanism, a polarized magnet for making and breaking the circuit of said release-magnet, means for controlling the direction of current through said polarized magnet, a recorder mechanism, and electrical devices arranged in the circuit of said make and break devices for controlling said recorder mechanism, as and for the purpose set forth.

28. In an apparatus of the class described, circuit make and break devices, means for displacing said devices from initial position, means for yieldingly opposing the displacement of said devices and tending to normally return or restore the same to initial position, a locking mechanism for maintaining said devices in displaced position, a release mechanism for said locking mechanism including a rotatable ratchet-wheel, a release-magnet, a pawl-link for actuating said release-wheel, means actuated by said magnet when energized for moving said pawl-link into position to operate said wheel, means yieldingly opposing the action of said magnet, means for controlling the circuit of said release-magnet, a recorder mechanism, and electrical devices arranged in the circuit of said make and break devices for controlling said recorder mechanism, as and for the purpose set forth.

29. In an apparatus of the class described, a pole-changing switch device, a polarized magnet, a release-magnet, said polarized magnet operating to make and break the circuit of said release-magnet, register mechanism, locking mechanism therefor, release devices controlled by said release-magnet for releasing said register mechanism, circuit make and break devices controlled by said register mechanism, a recorder mechanism, and electrical devices arranged in the circuit of said make and break devices for controlling said recorder mechanism, as and for the purpose set forth.

30. In an apparatus of the class described, a register, means for registering thereon by unit-tallies, associated means for registering the unit-tallies in units of higher denominations, and means for printing successively the numerals of the registered units of each denomination, as and for the purpose set forth.

31. In an apparatus of the class described, a register, means for registering thereon by unit-tallies, associated means corresponding to the units of each denomination to be recorded for registering the unit-tallies in units of such higher denomination, and means for successively printing the numerals of the registered units of each denomination, as and for the purpose set forth.

32. In an apparatus of the class described, a register, means for registering thereon by unit-tallies, associated means for registering unit-tallies in units of higher denominations, and means controllable solely from a central station for printing successively the numerals of the registered units of each denomination, as and for the purpose set forth.

33. In an apparatus of the class described, a register, means for registering thereon by unit-tallies, associated means for registering the unit-tallies in units of higher denominations, means for displacing said registering means to effect the registering operations, means for returning said registering means to initial position, a single recording device, and means actuated by the successive return of said registering means to initial position for successively actuating said recording device to record the registered unit of each denomination, as and for the purpose set forth.

34. In an apparatus of the class described, a register, means for registering thereon by unit-tallies, associated means for registering the unit-tallies in units of higher denominations, means for displacing said registering means to effect the registering operations, means for returning said registering means to initial position, a single recording device at a central station, and means actuated by the successive return of said registering means for positioning said recording device successively to correspond to the unit of each denomination to be recorded thereby, as and for the purpose set forth.

35. In an apparatus of the class described, a register, means for registering thereon by unit-tallies, associated means for registering the unit-tallies in units of higher denominations, means for displacing said registering means to effect the registering operations, means for returning said registering means to initial position, a single recording device at a central station, means actuated by the successive return of said registering means for positioning said recording device successively to correspond to the unit of each denomination to be recorded thereby, and means located solely at the central station for controlling the return of said registering means to initial position, as and for the purpose set forth.

In witness whereof I have hereunto set my hand, this 23d day of October, 1903, in the presence of the subscribing witnesses.

CHESTER H. THORDARSON.

Witnesses:
E. C. SEMPLE,
S. E. DARBY.